United States Patent Office 3,513,111
Patented May 19, 1970

3,513,111
PREPARATION OF POLYMERS OF THE
POLYARYLIDENE TYPE
Johny Camille Hermans, Leuven, and Georges Joseph
Smets, Heverlee, Belgium, assignors to Gevaert-Agfa
N.V., Mortsel, Belgium, a company of Belgium
No Drawing. Filed Apr. 20, 1967, Ser. No. 632,209
Claims priority, application Great Britain, May 12, 1966,
21,200/66
Int. Cl. C08g 33/00
U.S. Cl. 260—2                                    1 Claim

ABSTRACT OF THE DISCLOSURE

Polymers of the arylidene type are prepared by refluxing a reaction mixture comprising a solution of at least one aryl substituted diazo-lower-alkane in an homogeneous mixture of an aprotic and of a protic solvent, said reaction mixture being vividly colored by the presence of the diazoalkane, continuing said refluxing until complete discoloration of the reaction mixture, and precipitating the polyarylidene in a non-solvent.

---

The present invention relates to a process for the preparation of polymers of the polyarylidene type, i.e. polymers consisting of a polymethylene chain each carbon atom of which is substituted by an aromatic group or a heterocyclic group having an aromatic character.

It is known to prepare polybenzylidene by the decomposition under anhydrous conditions at −80° C. of phenyldiazomethane in toluene, catalyzed by boron trifluoridediethyl ether.

It has now been found that polymers and copolymers of the polyarylidene type can be prepared by the thermal decomposition of diazoalkanes in homogeneous medium.

According to the present invention a process is provided for the preparation of polymers of the polyarylidene type, which process comprises:

refluxing a reaction mixture comprising a solution of at least one substituted diazoalkane in an homogeneous mixture of an aprotic and of a protic solvent, said reaction mixture being vividly coloured by the presence of the diazoalkane, continuing said refluxing until complete discolouration of the reaction mixture, and precipitating in a non-solvent the polymer of the polyarylidene type formed.

Examples of suitable substituted diazoalkanes, the solutions of which are refluxed, are e.g. diazomethanes, in which the methyl group is substituted by an aryl group, a substituted aryl group or a heterocyclic group.

The reaction mixture comprises a homogeneous mixture of an aprotic solvent, e.g. benzene, toluene and diethylether and of a protic solvent such as methanol, isopropanol, t-butanol, etc.

In the process according to the present invention the temperature of the reaction mixture is raised to the reflux temperature. Refluxing can be carried out under atmospheric pressure as well as in a high vacuum. One normally proceeds as follows: the solution of a diazoalkane, e.g. phenyldiazomethane in a mixture of benzene and methanol is gradually heated while strongly stirring till the reflux temperature is obtained. The reaction mixture is vividly red-coloured by the influence of the phenyldiazomethane. By strongly refluxing, the reaction mixture gradually loses its red colour. After complete discolouration, the reaction mixture is poured into a large excess of methanol whereby the polybenzylidene formed precipitates.

The thermoplastic polymers of the polyarylidene type formed are transparent and have film-forming properties. They can be used as protective coatings on all kinds of supports.

The process according to the present invention is illustrated by the following examples.

EXAMPLE 1

In a 250 ccs. flask fitted with a reflux condenser, 10 millimols of phenyldiazomethane in a mixture of 40 ccs. of benzene and 10 ccs. of methanol are strongly refluxed (reflux temperature: 66–69° C.) on an oil bath (temperature: 100–100° C.). After complete discolouration of the mixture the solution containing the polymer formed is poured into methanol whereby the polymer precipitates. The polybenzylidene formed consists of recurring units of the following formula:

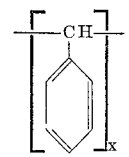

and has a molecular weight of about 6000 (polymerization degree=about 65=x). About 85% of the phenyldiazomethane has been converted to form the polymer.

EXAMPLE 2

This example is carried out analogously to Example 1 with the difference however that now a mixture of 5 millimols of phenyldiazomethane and 5 millimols of p-chlorophenyldiazomethane are dissolved in 40 ccs. of benzene and 10 ccs. of methanol. A copolymer of the polyarylidene type is formed having recurring units of the following formulae:

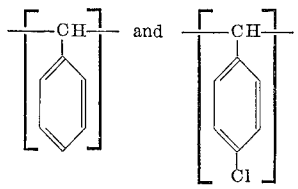

Yield: about 70%.

What we claim is:
1. A process for the preparation of polymers of the polyphenylidene type comprising the steps of (1) heating in the absence of a catalyst to reflux a reaction mixture comprising a solution of at least one phenyl diazomethane in a homogeneous mixture of organic aprotic solvent selected from the group consisting of benzene, toluene and diethylether, and a lower alkanol solvent, said reaction mixture being vividly colored by the presence of the phenyl diazomethane; (2) continuing said refluxing in the absence of a catalyst until complete discoloration of the reaction mixture; and (3) precipitating the polyphenylidene in a non-solvent for the polymer.

References Cited
UNITED STATES PATENTS
3,234,149  2/1966  Haszeldine et al. _____ 260—2

OTHER REFERENCES
Bawn et al., Journal of Polymer Science, vol. 33 (1958), pp. 21–26.

SAMUEL H. BLECH, Primary Examiner

U.S. Cl. X.R.
117—161